US007402075B1

(12) United States Patent
Probst

(10) Patent No.: US 7,402,075 B1
(45) Date of Patent: Jul. 22, 2008

(54) TERMINAL BLOCK WITH TWO MODES OF TERMINATING A WIRE

(75) Inventor: John F. Probst, Port Jefferson Station, NY (US)

(73) Assignee: TII Network Technologies, Inc., Copiague, NY (US)

( * ) Notice: Subject to any disclaimer, the term of this patent is extended or adjusted under 35 U.S.C. 154(b) by 0 days.

(21) Appl. No.: 11/564,057

(22) Filed: Nov. 28, 2006

(51) Int. Cl.
*H01R 11/20* (2006.01)
(52) U.S. Cl. ...................................... 439/410
(58) Field of Classification Search ............... 439/410, 439/409, 411, 412, 413, 414, 415, 417, 395
See application file for complete search history.

(56) References Cited

U.S. PATENT DOCUMENTS

| | | | | |
|---|---|---|---|---|
| 5,295,857 A | * | 3/1994 | Toly | 439/395 |
| 5,785,548 A | * | 7/1998 | Capper et al. | 439/409 |
| 5,860,829 A | * | 1/1999 | Hower et al. | 439/417 |
| 5,863,215 A | * | 1/1999 | Debbaut et al. | 439/412 |
| 6,152,760 A | * | 11/2000 | Reeser | 439/409 |
| 6,302,723 B1 | * | 10/2001 | Baum et al. | 439/412 |
| 6,315,595 B1 | * | 11/2001 | LaPorte et al. | 439/412 |
| 6,839,428 B2 | * | 1/2005 | Brower et al. | 379/413.04 |
| 2006/0099846 A1 | * | 5/2006 | Channell et al. | 439/411 |

* cited by examiner

*Primary Examiner*—Chandrika Prasad
(74) *Attorney, Agent, or Firm*—Cadwalader, Wickersham & Taft LLP

(57) ABSTRACT

A wire termination block includes at least one conductive contact; and a body having a base portion and a driving portion, the driving portion having a plurality of apertures for receiving wires and being operable in at least two driving modes to terminate and couple a received wire to the conductive contact. One of the two driving modes may be operable with a tool and the other of the two modes is operable without a tool by a user. For example, the driving portion may include a lever driven mechanism for terminating and coupling the received wires in a first of the two driving modes and a bolt driven mechanism for terminating and coupling the received wire in a second of the two driving modes. The conductive contact may be insulation displacement connector or contact (IDC).

21 Claims, 12 Drawing Sheets

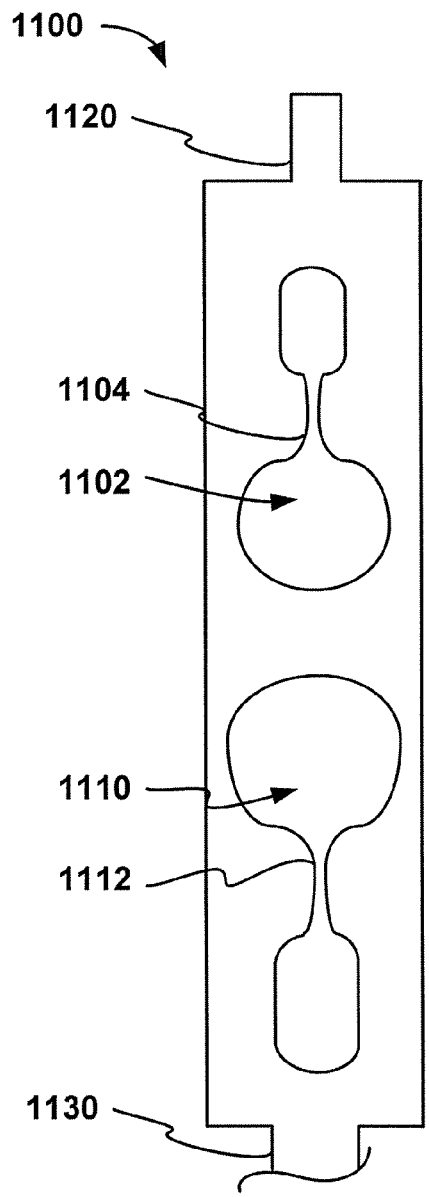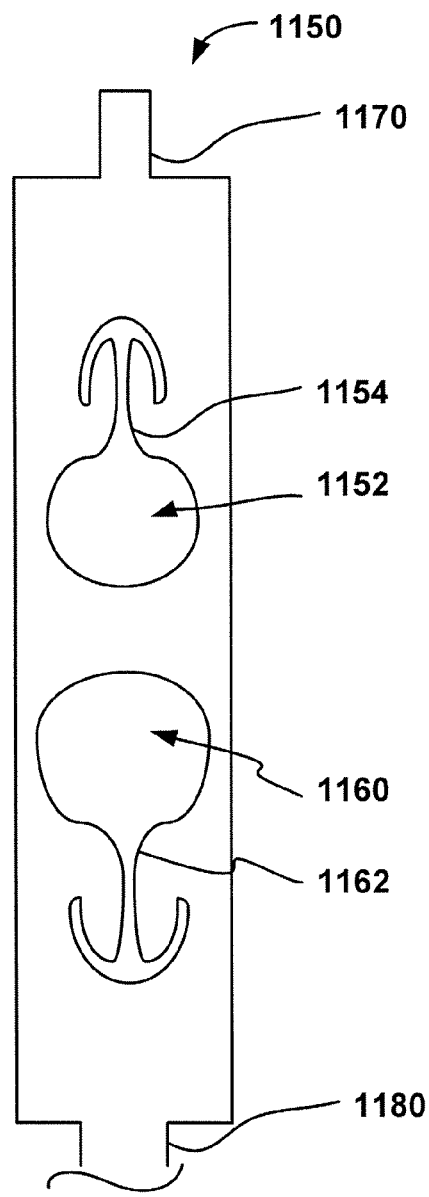
FIG. 11A  FIG. 11B

TERMINAL BLOCK WITH TWO MODES OF TERMINATING A WIRE

FIELD OF THE INVENTION

The present invention relates to a wire termination device and, more particularly, to an apparatus, system and method to facilitate termination or connection of various types of wires and/or in various types of ways.

BACKGROUND

Insulation displacement connector (IDC) terminals are used, for example, in various application such as with telephone cables or wires. These terminal may employ for instance a driving mechanism or driver, such as a hardware driven arrangement (e.g., driver bolts), which directs various gauge wires received therein over the IDC connectors. Generally, a hardware driven connector may be employed with small and large wire gauges. When a hardware driven connector is employed, the method of terminating either large or small gauge wire involves the use of a tool to back out the driver mechanism with a bolt that was captivated in the driver. When turning the bolt counter clockwise the driver mechanism would back out away from the IDC connector in a linear direction. Terminating the wire involves turning the bolt in a clockwise direction driving the driver housing downward over the IDC and cutting/terminating the wire. Therefore, for terminating large and small gauge, it is necessary to use the bolt and tool in this situation.

In many circumstances, wire termination operations often appear to involve small gauge wire terminations. Accordingly, the utilization of hardware driven connectors such as the bolt driven connections to terminate small gauge wires is cumbersome.

SUMMARY

Various embodiments are provided herein which address among other things the termination of small and large gauge wires, and so forth.

In accordance with an embodiment, a wire termination block includes at least one conductive contact; and a body having a base portion and a driving portion. The driving portion has a plurality of apertures for receiving wires and being operable in at least two driving modes to terminate and couple a received wire to the conductive contact. One of the two driving modes may be operable with a tool and the other of the two modes may be operable without a tool by a user. For example, the driving portion may include a lever driven mechanism for terminating and coupling the received wires in a first of the two driving modes and a bolt driven mechanism for terminating and coupling the received wire in a second of the two driving modes. The conductive contact may be an insulation displacement connector or contact (IDC).

In accordance with a further embodiment, a system for terminating a plurality of wires, includes an enclosure; and at least one termination block, maintained in the enclosure, including at least one conductive contact and a body having a base portion and a movable driving portion, the driving portion having a plurality of apertures for receiving wires and being operable in at least two driving modes to terminate and couple a received wire to the conductive contact.

In another embodiment, a system for terminating a plurality of wires, includes an enclosure configured to maintain one or more termination blocks; and at least one termination block including at least one terminal module having a base portion, a movable driving portion and a pair of insulation displacement connectors. The driving portion includes (1) a bolt driven mechanism with a first pair of apertures for receiving a TIP and RING wire pair and being operable by a user through use of a tool to linearly move the driving portion along the base portion to an open state for receiving a TIP and RING wire pair and a closed state for terminating and coupling the TIP and RING wire pair to respective insulation displacement connectors, and (2) a lever driven mechanism, arranged at a top of the driving portion, with a lever body having a lever arm and second pair of apertures for receiving a TIP and RING wire pair and being operable by a user through the lever arm without the use of a tool to pivot the lever body to an open state for receiving a TIP and RING wire pair and a closed state for terminating and coupling the TIP and RING wire pair to respective insulation displacement connectors. The first pair of apertures is arranged below the second pair of apertures on the driving portion.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The various exemplary embodiments will be described with reference to the accompanying drawings, wherein:

FIGS. 11A and 11B illustrate two exemplary conductive contacts of an exemplary wire termination block;

DETAILED DESCRIPTION OF THE VARIOUS EMBODIMENTS

Figure 1:
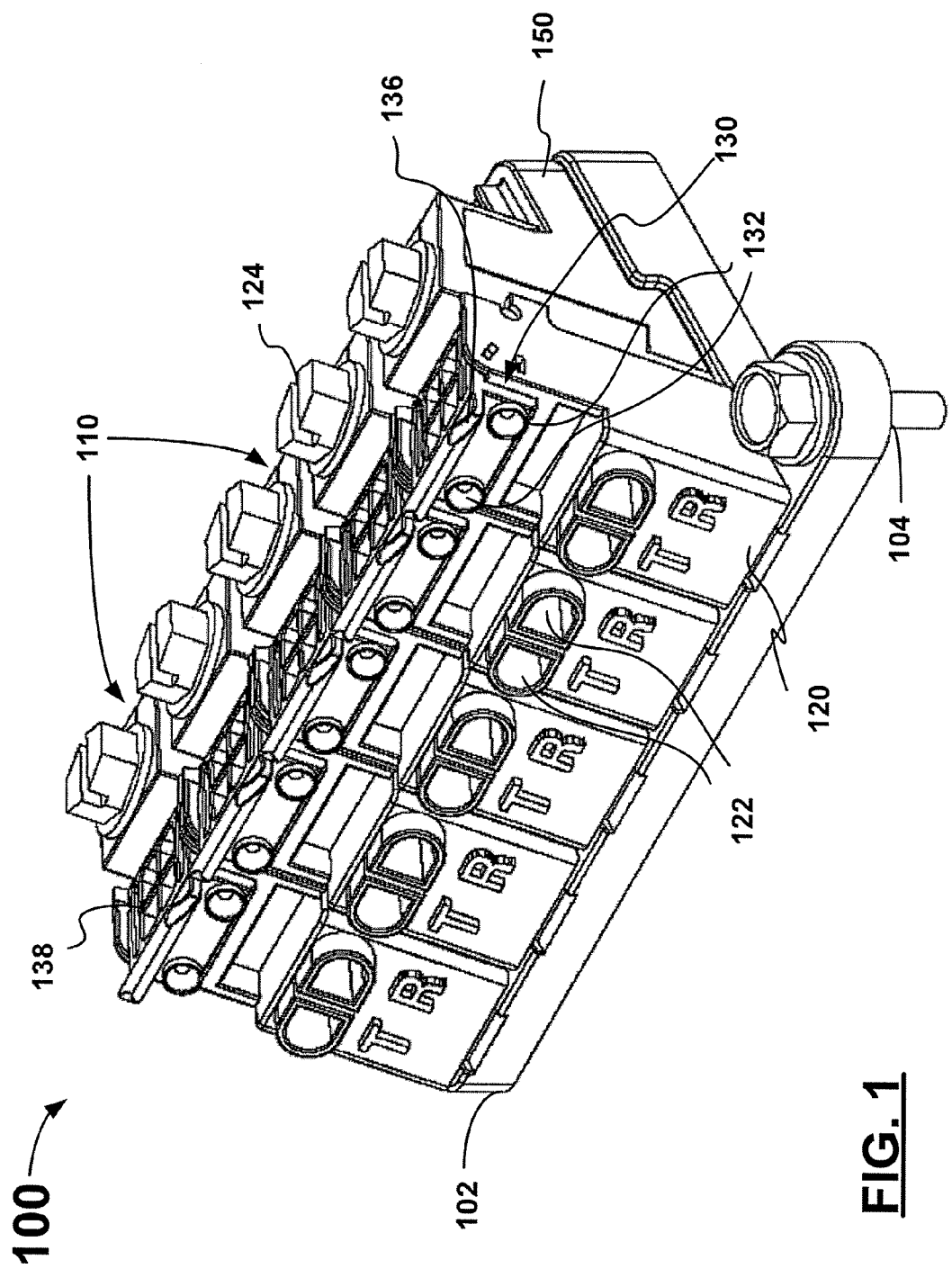
FIG. 1 is an angled frontal view of an exemplary wire termination block in accordance with an embodiment.
Figure 2:
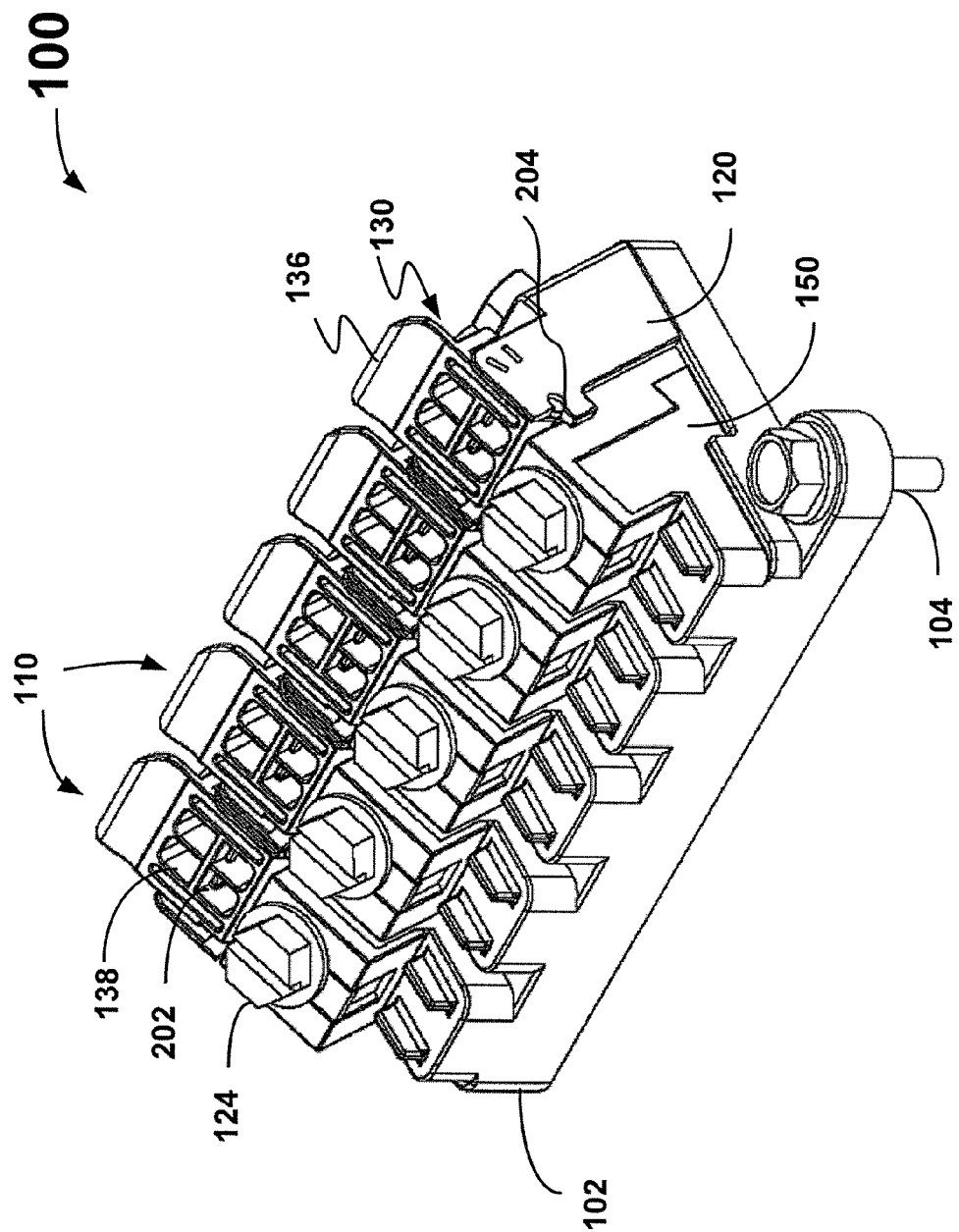
FIG. 2 is a angled back view of an exemplary wire termination block in accordance with an embodiment.
Figure 3:
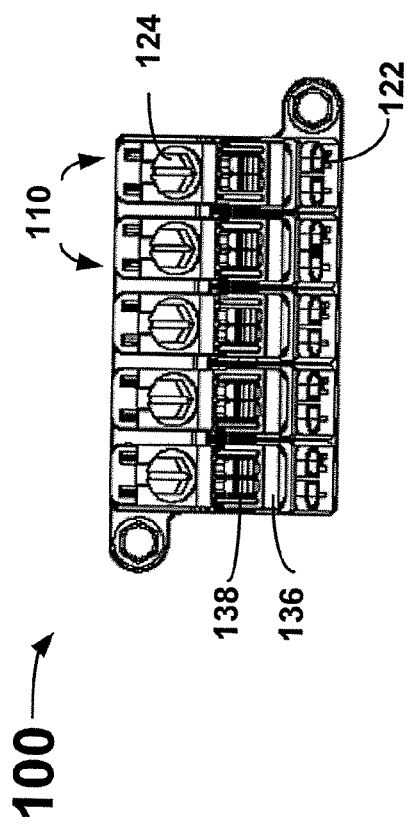
FIG. 3 is a top view of an exemplary wire termination block in accordance with an embodiment.
Figure 4:
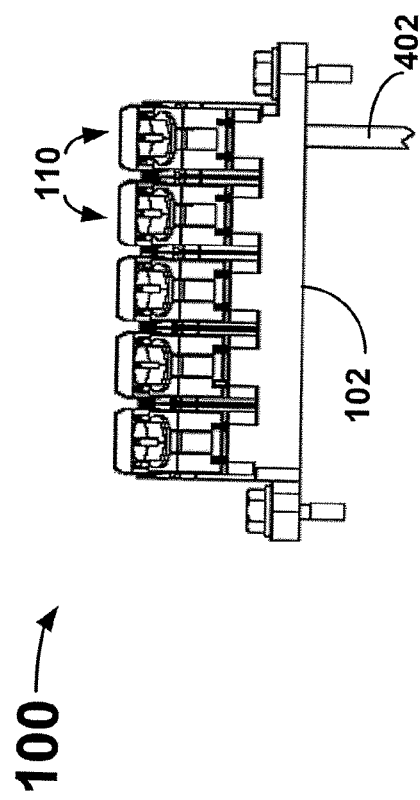
FIG. 4 is back view of an exemplary wire termination block in accordance with an embodiment.
Figure 5:
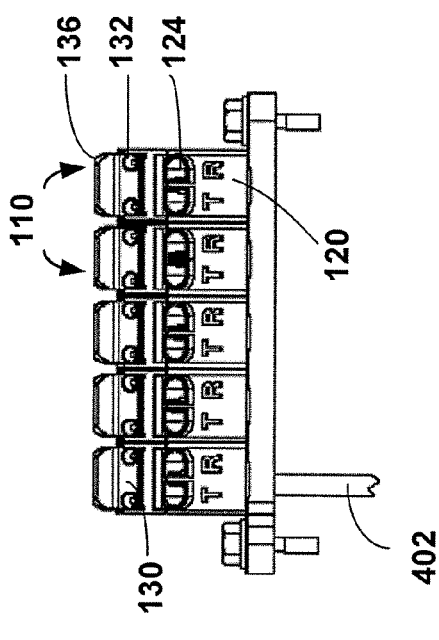
FIG. 5 is a front view of an exemplary wire termination block in accordance with an embodiment.
Figure 6:
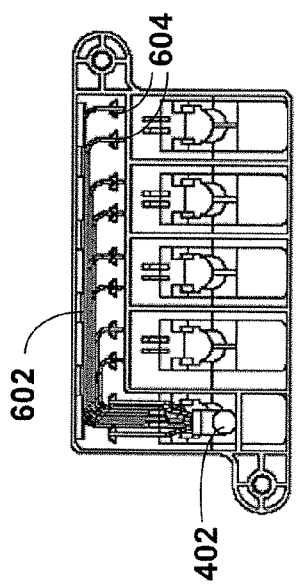
FIG. 6 is a bottom view of an exemplary wire termination block in accordance with an embodiment.

FIGS. 1 and 2 are angled frontal and back views of an exemplary wire termination (or terminal) device or block (hereinafter "block") 100 in accordance with an embodiment. As shown, in this example, the wire termination block 100 includes a plurality of terminal modules 110 for terminating and interconnecting a wire(s) or the like to a contact(s), such as an insulation displacement contact(s) or connector(s), arranged in or associated with each terminal module 110. The terminal modules 110 are arranged on a base platform 102 which includes fastener arrangement(s) 104 for securing or fastening or mounting the block 100 in an enclosure (or housing) or to other structures.

Each terminal module 110 is configured to operate in at least two different driving modes for terminating and connecting one or more wires received therein to one or more contacts. The two driving modes may include for example one mode which is operable with a tool or device (e.g., a tool driven mode) and another mode which is operable without a tool by a user or operator (e.g., a tool-less driven mode).

Each terminal module 110 may include a base module 150, a driving module 120 arranged to move relative to the base module 150, and a contact(s) such as a conductive contact(s). The contact(s) may be insulation displacement connector(s) or contact(s), also referred to as IDCs.

The driving module 120 includes a hardware or tool driven mechanism which includes one or more apertures 122 for receiving a wire or line for termination and connection or coupling to a contact, and a bolt 124 for driving the module 120. The driving module 120 may be operated via the bolt 124 to drive the module 120 to an open position for receiving wires in the apertures 122 and to a closed position for terminating and connecting or coupling the wires to a contact. Likewise, these operations may be employed in reverse to remove or unterminate wires from a terminal module 110. In this example, the apertures 122 may be a pair of apertures such as for TIP and RING and may be configured to receive small and large gauge wires, or approximately 18.5-24 gauge wires. The number, size and configuration of the apertures and contact(s) may be varied as desired depending on the type of wires and application for the termination block 100.

The modules 150, 120 may also be configured with tongues and grooves to provide for linear movement of the driving module 120 on or relative to the base module 150 when the bolt 124 is actuated or turned through use of a tool or device by the user or operator. As shown, the base module 150 may be arranged at an angle relative to the axis of the base platform 102 to provide for angular linear movement of the driving module 120 thereon. The base module 150 may be connected, detachably connected or integrally formed with the base platform 102.

The driving module 120 further includes a tool-less or non-hardware driven mechanism, e.g., lever (or rocker) driven mechanism 130, which includes a lever body with one or more apertures 132 for receiving a wire or line for termination and connection or coupling to a contact, and a lever arm 136 for driving the mechanism 130. As shown in this example, the lever driven mechanism 130 or its body may be pivotally connected or arranged, via a hinge or at a pivotal point 204, on an upper or top portion of the driving module 120. The lever driven mechanism 130 may be operated via the lever arm 136 to drive the mechanism 130 or lever body to an open position for receiving wires in the apertures 132 and to a closed position for terminating and connecting or coupling the wires to a contact. Likewise, these operations may be employed in reverse to remove or unterminate wires from a terminal module. For instance, in this example, the lever arm 136 may be moved upward to the open position and downward to a closed position. The apertures 132 may also be a pair of apertures such as for TIP and RING and may be configured to receive small gauge wires, or approximately 22-26 gauge wires. The number, size and configuration of the apertures and contact(s) may be varied as desired depending on the type of wires and application for the termination block 100.

The lever driven mechanism 130 may also include test ports (or test apertures or access points) 138 through which testing equipment or device may access and conduct tests across the contact(s) of a terminal module 110. In this example, the contact of the terminal module 110 may be directly or indirectly accessed via a contact portion(s) 202. The contact portion(s) 202 may be part of the contact (of terminal module 110) to which wires are to be terminated and coupled, or may be an intermediary connector, such as a clip or connector, connected or electrically coupled to the contact of the terminal module 110. The contact portion 202 and/or cavities associated with the apertures may be filled with a suitable gel to provide a sealing function versus the environment.

In this example, the termination block 100 may be configured with the following exemplary dimensions. For example, the height of the termination block 100 from the bottom of the base platform 102 to the top of the driving module 120 may be approximately 1.87 inches, the length of the base platform 102 may be approximately 4.38 inches and the width of the base platform 102 may be approximately 2.27 inches. Each terminal module 110 may also be of the sealed-type or provide for an environmental seal. For example, the terminal module 110 may employ a gel which is filled in the various cavities of the terminal module 110 and encases components (e.g., contacts, apertures, ports, etc.) of the terminal module 110.

Although the wire termination block 100 is described above as having five terminal modules 110 (e.g., a five pair sealed termination block), the block 100 may include any number of terminal modules (e.g., 1, 3, 5, etc.) as desired. Various characteristics of termination block 100 may also be varied. For example, the size and shape and material of the components (e.g., apertures, lever arm, tongue and groove, etc.) may be suitably selected and configured depending on the application. The driving direction of the open and closed positions for the bolt and lever examples may also be varied or reversed, as desired. Other types of tool-less and tool driven mechanisms or configurations may also be employed to provide the different modes of terminating and coupling wires to a contact(s). For example, the driving mechanisms may have their range of movement (e.g., linear, rotational, etc.) limited, such as through use of a stopper or other range limiting means.

The wire termination block 100 may be employed with wire(s) such as TIP and RING wire pair or other types and number of wires or lines or with other components such communication network components, e.g., network interface device (NID) and so forth. The wire termination block 100 may also be used in various applications, including but not limited to cross-connection, bridging, site termination, connecting service provider lines to customer lines on the ground (e.g., in pedestals) or in the air (e.g., on poles), and so forth.

FIGS. 3, 4, 5 and 6 provide additional views of the components of an exemplary wire termination block 100. For example, FIGS. 3, 4, 5 and 6 are top, back, front and bottom views respectively of the exemplary wire termination block 100. As further shown in FIGS. 4 and 6, the termination block 100 provides for interconnection between the contacts (e.g., IDCs) of each of the terminal modules 100 via wires, lines or conductors 602. As shown by reference to numeral 604, the contacts or connection to the contacts are provided on an underside of the base platform 102. For example, the contacts may be mounted on the base module 150 or base platform 102 and have a portion extend through to the underside of the base platform 102 for interconnection and coupling to other wire(s), line(s), conductor(s), contact(s) of other terminal module(s) or termination blocks and so forth. To provide for interconnection with other wires or lines or other wire termination blocks, there is also shown a wire(s) or line(s) or conductor(s) 402.

Figure 7:
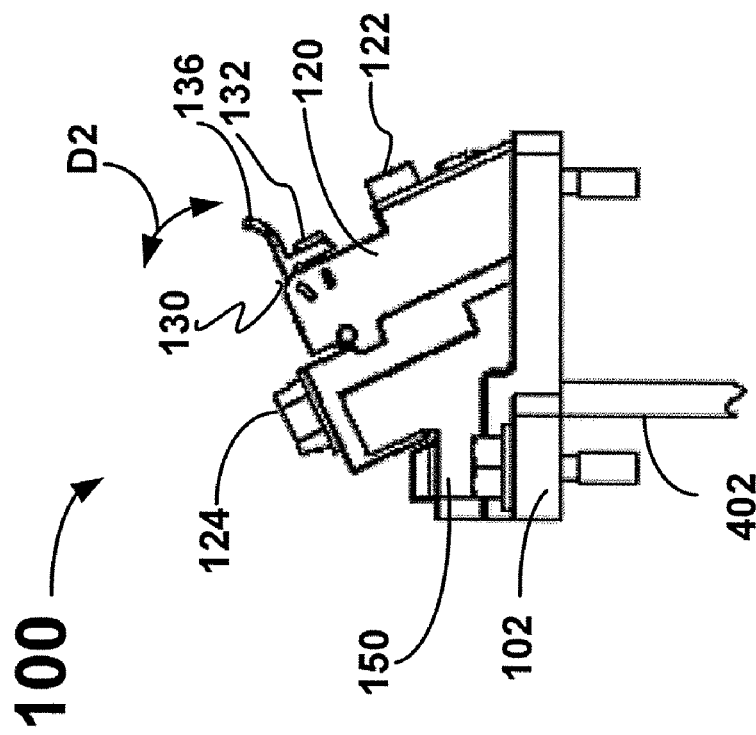
FIGS. 7 and 8 are side views of an exemplary wire termination block in accordance with an embodiment.
Figure 8:
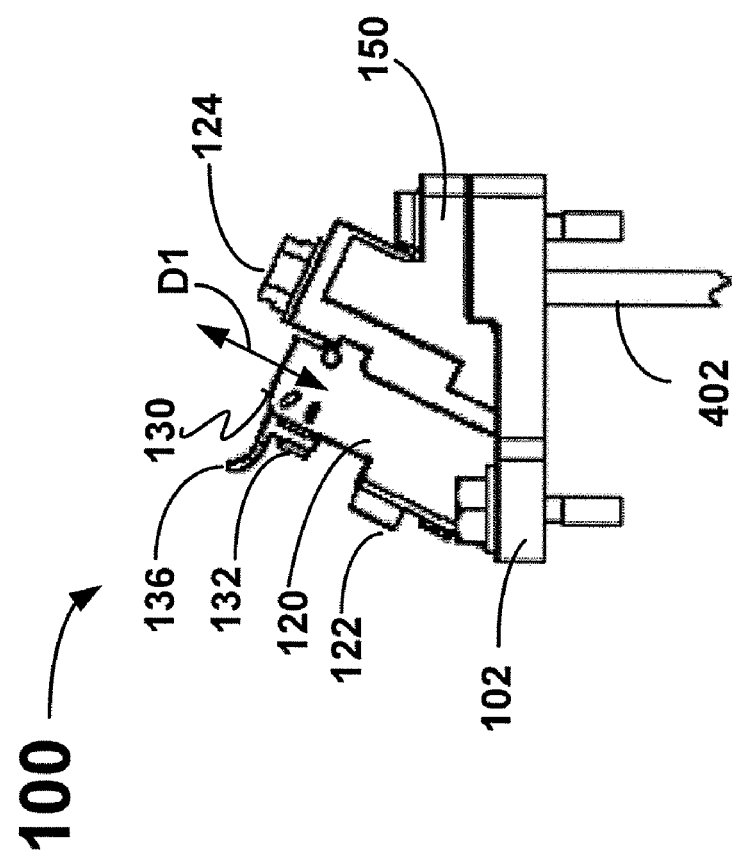

FIGS. 7 and 8 are side views or profiles of the exemplary wire termination block 100 in accordance with an embodiment. As further shown in FIG. 7, the driving module 120 may be driven linearly using the bolt 124 in an upward or downward fashion shown by reference to D1 to receive or terminate or unterminate wire(s). The lever driven mechanism 130 may also be driven pivotally or in an arc in an upward or downward fashion via lever (or rocker) arm 136 to receive or terminate or unterminate wire(s).

Figure 9:
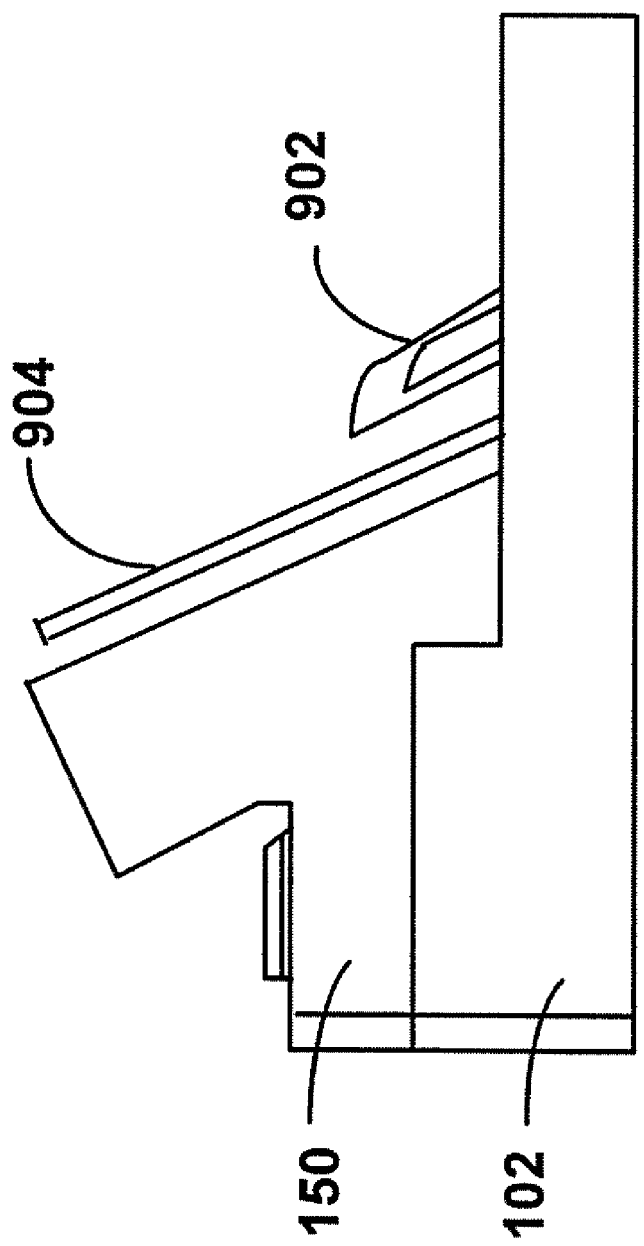
FIG. 9 is a partial side view of an exemplary wire termination block in accordance with an embodiment.

FIG. 9 is a simplified partial side view of an exemplary wire termination block 100 in accordance with an embodiment. In this Figure, there is shown one or more fingers 902 extending from the base 150 or base platform 102. The fingers 902 are configured to allow linear movement of the driving portion 120 when the bolt 124 is driven to an open position, but are also configured to prevent or reduce lateral movement, such as in the frontal direction, of the driving module 120 when the lever driven mechanism 130 or its lever arm 136 is operated. For example, when the driving module 120 is seated on the base module 150 or base platform 102 and the lever arm 136 is operated, the fingers 902 would abut the internal walls of the driving module 120 lateral movement In this example, there may be three fingers 902 configured to engage or be received by the driving module 120 such as when the driving module is seated on the base module 150 or base platform 102.

Also show in FIG. 9 is a contact 904 arranged in or associated with a terminal module 110. The contact 904 may be a conductive contact or an insulation displacement connector or contact (IDC). For terminating TIP and RING wire pair(s), each terminal module may include a pair of contacts 904. The contacts 904 may be arranged, mounted or secured on the base portion 150 or base platform 102.

Figure 10:
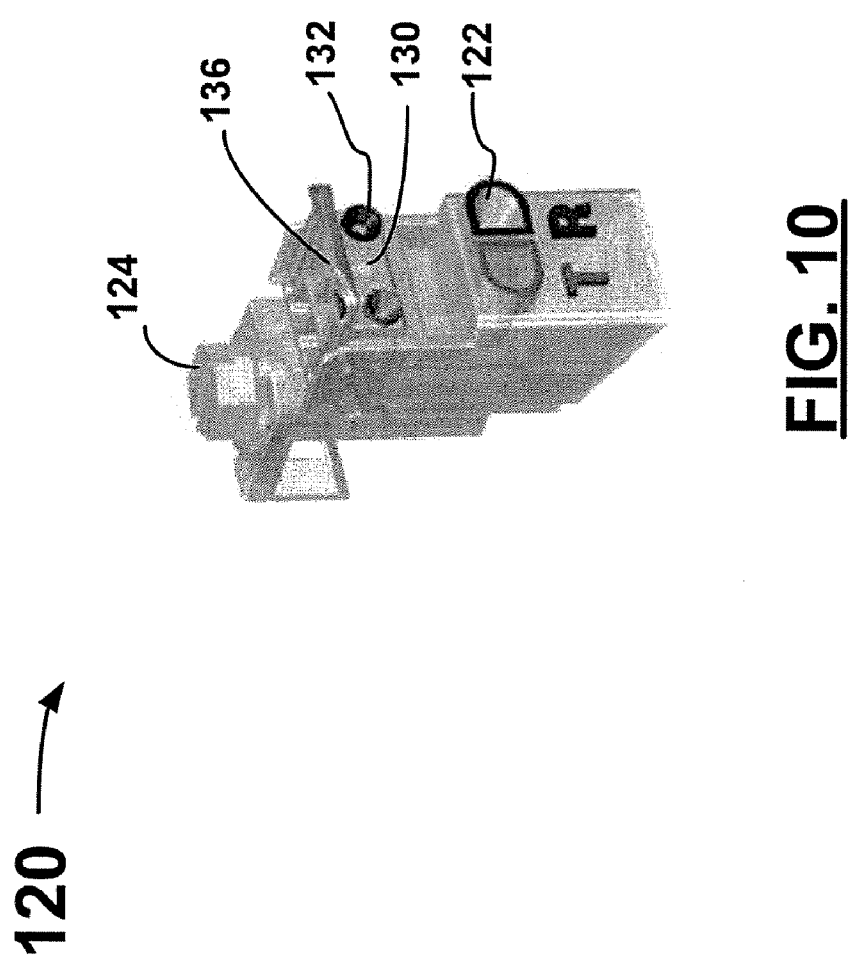
FIG. 10 is an angled frontal view of a driving module of an exemplary wire termination block in accordance with an embodiment.

FIG. 10 is an angled frontal view of a driving module 120 of an exemplary wire termination block 100 in accordance with an embodiment. In this view, the driving module 120 is shown separately from the base module 150. As shown, the driving module 120 or its body may be made or formed of a suitable translucent material, and includes lower apertures 122 and upper apertures 132 for receiving, for example, TIP and RING wires or lines. The use of a translucent material may further assist the user or operator during a termination operation to ensure that the wires are properly terminated in the termination block 100. Each of the apertures 122, 132 may be color coded or labeled, as desired, to identify the particular wire(s) to be received or the particular connection to be terminated. As described above, the exemplary driving module 120 may be driven in one mode by turning the bolt 124 with a tool or device to terminate and couple wires received in the lower apertures 122 to a contact(s) or may be driven in another mode using the lever arm 136 of the lever driven mechanism 130 to terminate and couple wires received in the upper apertures 132 to a contact(s).

Although the driving module 120 is shown as employing a bolt driven mechanism and a lever mechanism, the driving module 120 may be configured with other combinations of hardware or tool driven mechanism (e.g., other fastener arrangements) and/or other tool-less driven mechanisms.

FIGS. 11A and 11B illustrate two exemplary conductive contacts 1100 and 1150 suitable for use with a wire termination block 100. As shown FIG. 11A, the conductive contact 1100 includes an upper slot 1102 and a lower slot 1110 for receiving wires, for example, inserted through apertures 132, 122 respectively of a terminal module 110 of a termination block 100. Each of the slots 1102, 1110 may be configured to taper in an upward or downward or a desired direction relative to the movement of a received wire when driven from an open to closed condition or position. In this example, the upper slot 1102 tapers or narrows in an upward direction as shown by reference to numeral 1104, and the lower slot 1110 tapers or narrows in a downward direction as shown by reference to numeral 1112. The shape and/or size (e.g., width) at which the slots 1102, 1110 taper or narrow may be configured according to the size or nature of the wires to be received, e.g., small and/or large gauge wires.

The conductive contact 1100 may also include a top portion 1120 suitably sized or configured (e.g., width, length, shape and/or material) to allow direct or indirect (e.g., through clip or other intermediary connection or connector) access thereto by testing equipment or device or probe, such as via testing ports 139 of a terminal module 110 (FIG. 1). The bottom portion 1130 of the contact 1100 may also be suitably sized (e.g., width, length and/or shape) to extend into and/or through the base 102 for interconnection with other wires, lines or conductors which interconnect with other terminal modules 110 or wire termination blocks 100 or other wires or lines (e.g. communication lines). Examples of such other wires or conductors is shown and described above with reference to FIG. 5.

As shown in FIG. 11B, the conductive contact 1150 includes an upper slot 1152 and a lower slot 1160 for receiving wires, for example, inserted through apertures 132, 122 respectively of a terminal module 110 of a termination block 100. Each of the slots 1152, 1160 may be configured to taper in an upward or downward or a desired direction relative to the movement of a received wire when driven from an open to closed condition or position. In this example, the upper slot 1152 tapers or narrows in an upward direction as shown by reference to numeral 1154, and the lower slot 1160 tapers or narrows in a downward direction as shown by reference to numeral 1162. The shape and/or size (e.g., width) at which the slots 1152, 1160 taper or narrow to may be configured according to the size of the wires to be received, e.g., small and/or large gauge wires.

The conductive contact 1150 may also include a top portion 1170 suitably sized or configured (e.g., width, length, shape and/or material) to allow direct or indirect (e.g., through clip or other intermediary connection or connector) access thereto by testing equipment or device or probe, such as via testing ports 139 of a terminal module 110 (FIG. 1). The bottom portion 1180 of the contact 1150 may also be suitably sized (e.g., width, length and/or shape) to extend into and/or through the base 102 for interconnection with other wires, lines or conductors which interconnect with other terminal modules 110 or wire termination blocks 100 or other wires or lines (e.g. communication lines). The bottom portion of the contacts may be interconnected, for example, to wires or contacts in manner such as shown and described above with reference to FIG. 5.

When the wires to be received are insulated, the conductive contacts 1100 and 1150 may be configured as insulation displacement connectors (IDCs). In this exemplary case, the tapering edges 1104, 1112, 1154, 1162 of each of the slots 1102, 1110, 1152, 1160 respectively may be suitably sharp or sharpened to cut through the insulation of a received wire and to enable contact with the core (e.g., metallic or conductive portion) of the wire. If the wires to be received are not insulated, the tapering edges 1104, 1112, 1154, 1162 may be blunt or un-sharpened. As such, the wire termination block 100 or terminal module 110 may be an IDC or non-IDC termination block or terminal module or a combination thereof, as desired. Further, depending on the application, any number of contacts 1100, 1150 may be employed in for example a terminal module 110. In the TIP and RING example, the terminal module 110 would employ a pair of contacts, i.e., one for TIP connection and the other for RING connection.

Figure 12:
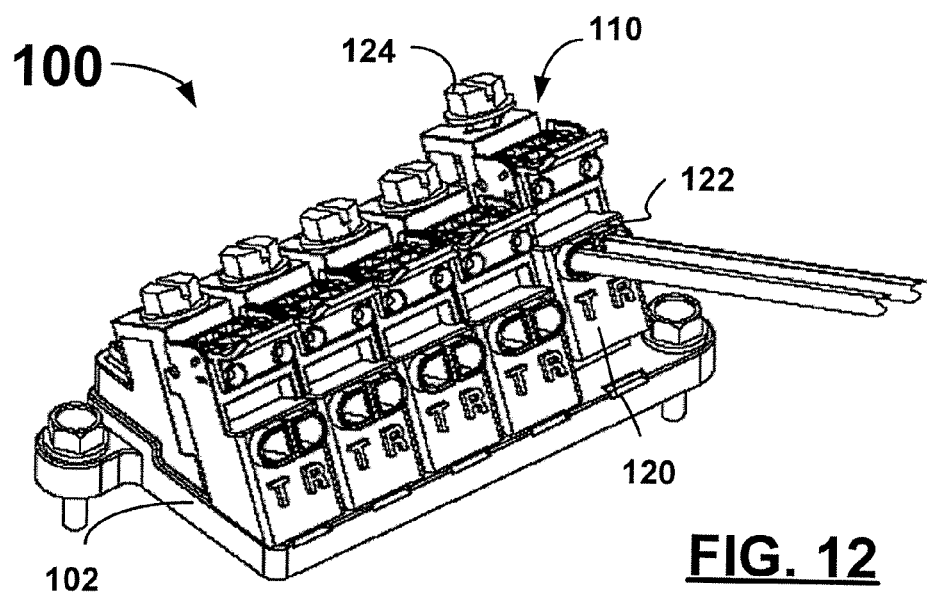
FIGS. 12 and 13 illustrate an example of an operation for terminating wires with a hardware driven mechanism such as a bolt driven mechanism of an exemplary wire termination block in accordance with an embodiment.
Figure 13:
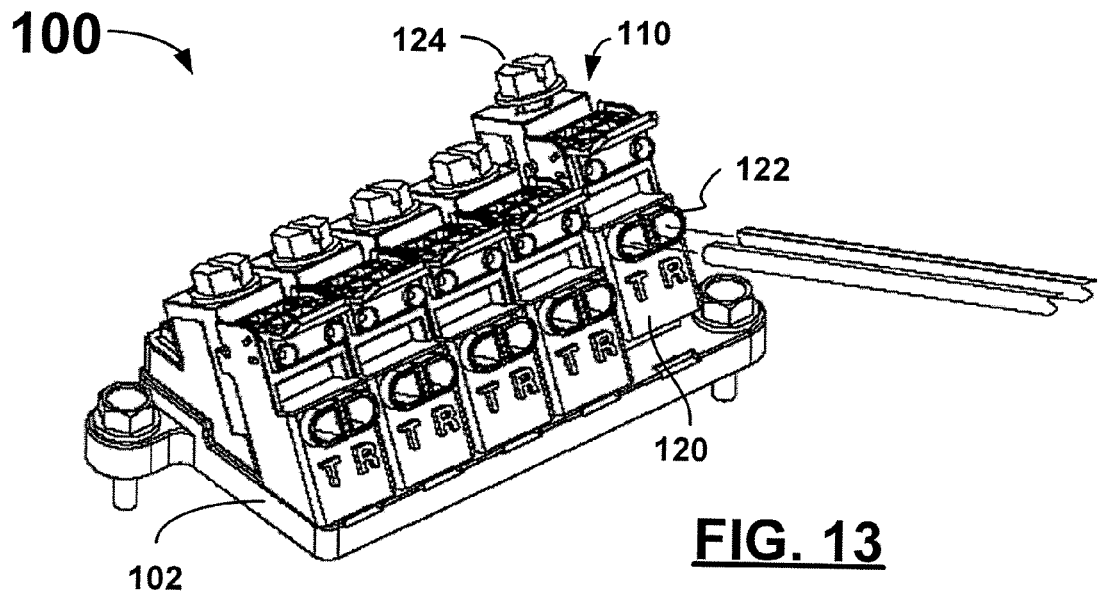

FIGS. 12 and 13 illustrate an example of an operation for terminating wires with a hardware driven mechanism, such as a bolt driven mechanism, of an exemplary wire termination block 100 in accordance with an embodiment. As shown in FIGS. 12 and 13, the rightmost driver module 120 of a terminal module 110 is driven to an open position (e.g., up position) by a user or operator with the use of a tool or device. For example, the bolt 124 is turned counter clockwise causing the driver module 120 to linearly and at an angle back out from the base module 150 or base platform 102 to an open position. At the open position, the apertures 122 are aligned with the conductive connectors (e.g., 1100, 1150) of the terminal module 110 to receive wires therethrough. The wires, such as small or large gauge wires, can then be inserted into the respective apertures 122. The inserted wires are then terminated and coupled to the conductive connectors by turning the bolt 124 in a clockwise direction, thereby driving the driver module 120 and the received wires in a downward direction to terminate and couple the wires to the conductive connectors at a closed position (e.g., down position). An example of the closed position is shown by the leftmost terminal module 110 of the termination block 100 of FIGS. 12 and 13. When the conductive connectors are IDC connectors, the downward action of the driver module 120 causes the insulation of a received wire to be displaced, e.g., cut, and the wire to be coupled to the IDC connector.

Figure 14:
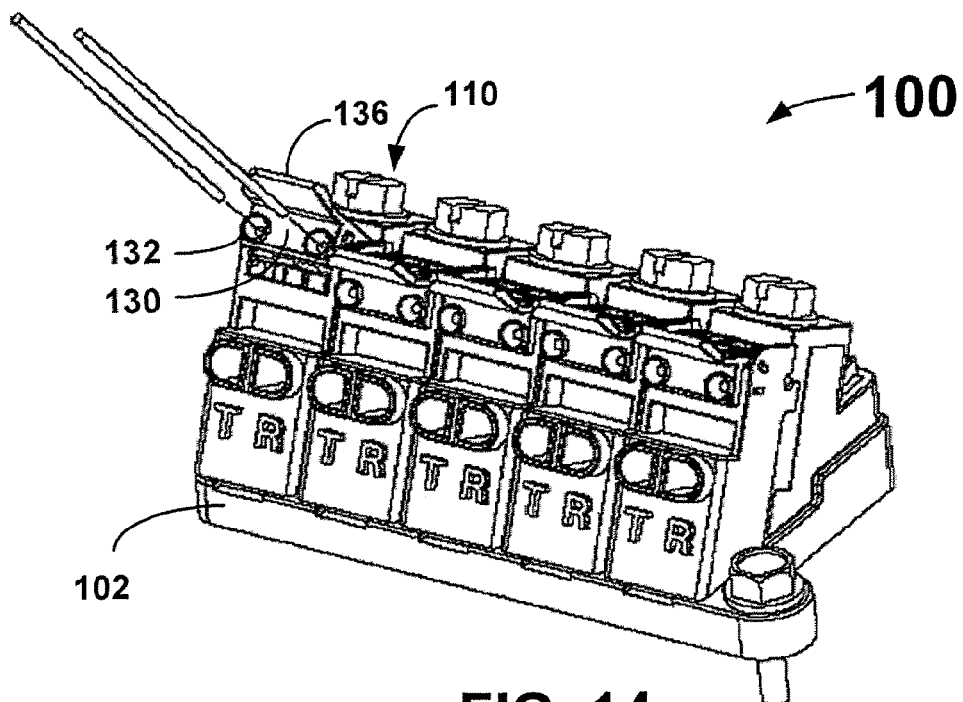
FIGS. 14 and 15 illustrate an example of an operation for terminating wires with a non-hardware driven mechanism such as a lever driven mechanism of an exemplary wire termination block in accordance with an embodiment.
Figure 15:
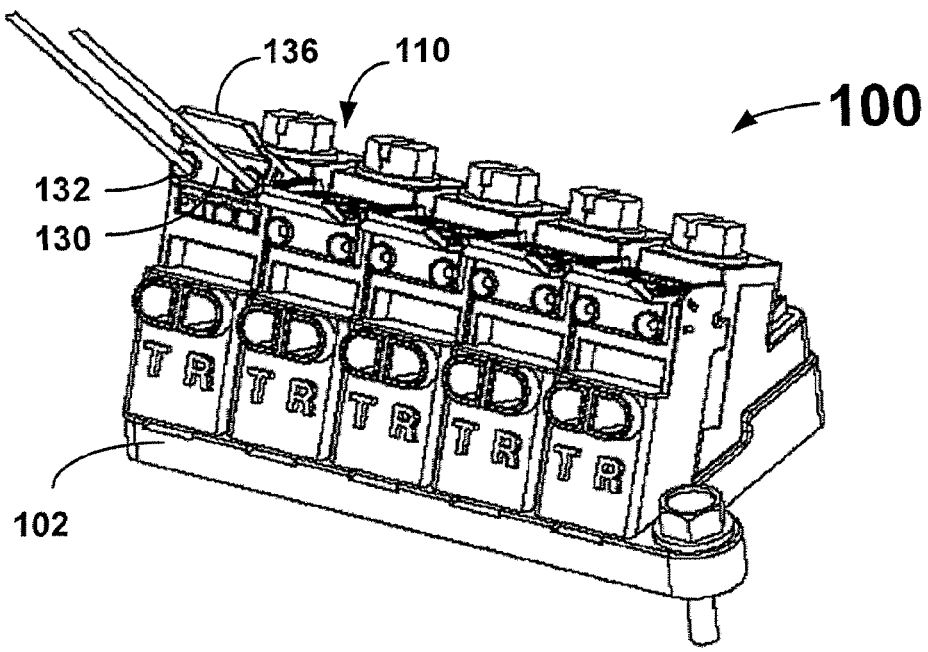

FIGS. 14 and 15 illustrate an example of an operation for terminating wires with a non-hardware or tool-less driven mechanism such as a lever driven mechanism 130 of an exemplary wire termination block 100 in accordance with an embodiment. As shown in FIGS. 14 and 15, to terminate wires, the driver module 120 can be operated to terminate and couple wires by a user or operator without the use of a tool or device. For example, the lever 136 of the lever driven mechanism 130 is moved or pivoted in an upward direction to an open position. At the open position, the apertures 132 are aligned with the conductive connectors (e.g., 1100, 1150) of the terminal module 110 to receive wires therethrough. The wires such as small gauge wires or other types of wires can then be inserted into the respective apertures 132. The inserted wires are then terminated and coupled to the conductive connectors by moving or pivoting the lever arm 136 downward to terminate and couple the wires to the conductive connectors at a closed position. An example of the closed position for the lever mechanism 130 is shown by the rightmost terminal module 110 of the termination block 100 of FIGS. 14 and 15. When the conductive connectors are IDC connectors, the downward action of the driver module 120 causes the insulation of a received wire to be displaced, e.g., cut, and the wire to be coupled to the IDC connector.

Figure 16:
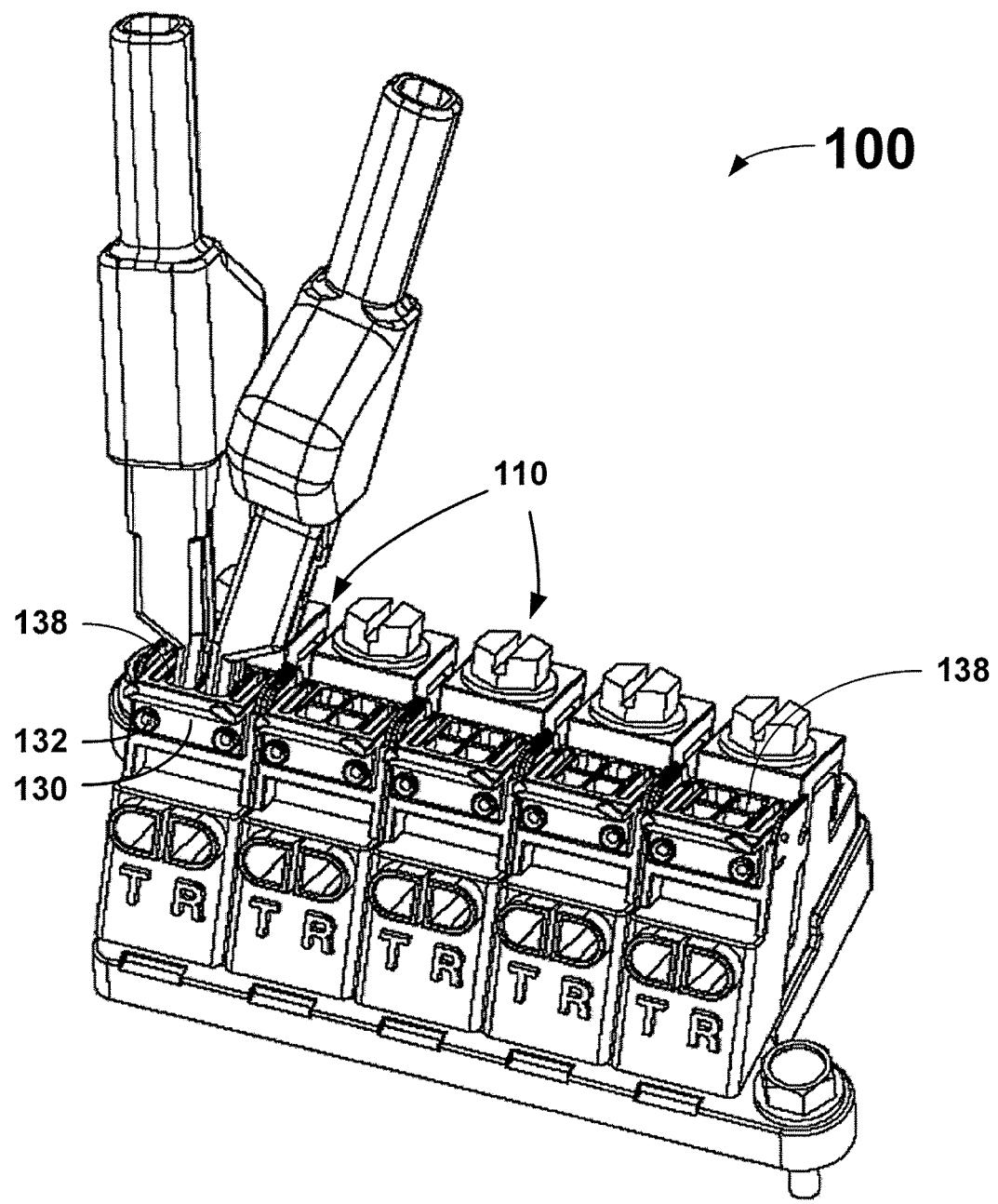
FIG. 16 illustrates an example of a testing operation through test ports of an exemplary wire termination block in accordance with an embodiment.

FIG. 16 illustrates an example of a testing operation through test ports (or test apertures or test access points) of an exemplary wire termination block 100 in accordance with an embodiment. For example, a testing device or probe can be inserted through testing ports 138 positioned at the top of the lever driven mechanism 130 of a terminal module 110. Through the testing ports 138, the testing device can connect or couple to the conductive contact(s) of a terminal module 110. In this example, the TIP and RING can be tested. As with the other apertures of the terminal module 110 or termination block 100, the testing ports 138 can be filled with a suitable sealing gel, such as an insulating gel, or configured to create an environmental seal even during testing of the termination block or other wires or lines (e.g., communication or telephone lines or cables) connected thereto. Through the testing ports 138, various tests can be performed for example without disturbing the customer or subscriber line connection or other wires or lines connected thereto.

Figure 17:
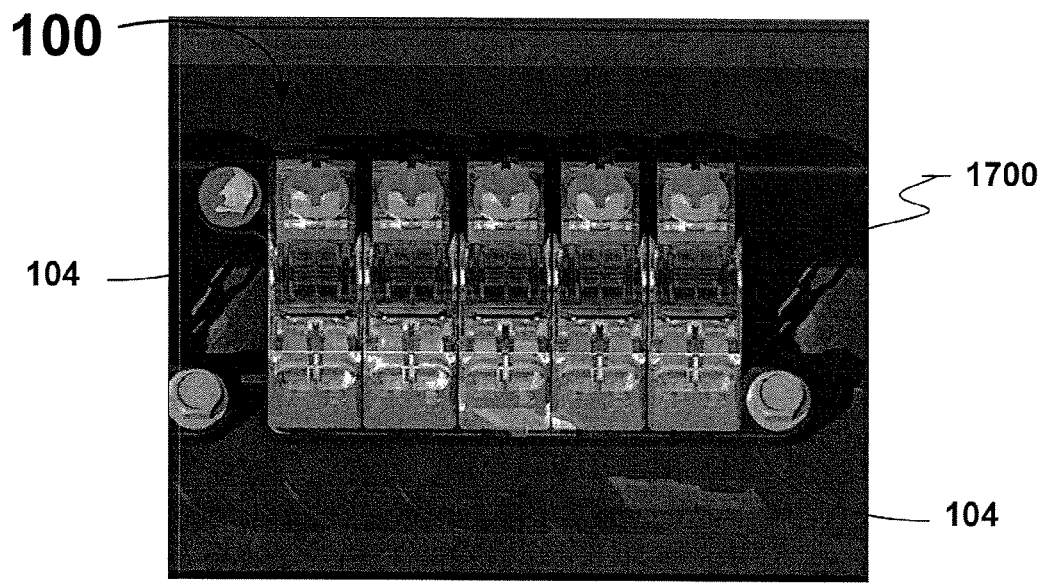
FIGS. 17 and 18 illustrate one or more exemplary wire termination blocks maintained in an enclosure in accordance with an embodiment.
Figure 18:

FIGS. 17 and 18 illustrate one or more exemplary wire termination blocks 100 maintained in an enclosure (or housing) 1700 in accordance with an embodiment. As shown, the enclosure 1700 may be pre-configured to receive one or more termination blocks 100 and may include suitable holes (not shown) for receiving wire(s), cables, etc. therein. The enclosure 1700 may be an aerial enclosure, cross-connect enclosure, non-aerial enclosure or other form of enclosure used to maintain termination block(s), and may be configured with hinges or other suitable hardware to enable the enclosure to be accessed or opened and secured or closed.

Although the wire termination blocks 100 are shown as being maintained in a side to side fashion in the enclosure 1700, the enclosure 1700 may be pre-configured to maintain wire termination blocks in other configurations, e.g., top to bottom, and numbers (e.g., one block, two blocks, three blocks, etc.) and to maintain any number of wire termination blocks. Further, the enclosure may also house or maintain other components, such as those employed in conjunction with the termination block 100. These components may include among other things network communication components, e.g., network interface devices (NIDs) and so forth.

In one example, the enclosure 1700 may be an aerial enclosure having a clamshell-type cylindrical portion for receiving cable, a clamshell-type rectangular portion for terminating wires and an aerial hanging mechanism such as aerial hanger straps for hanging and employing the enclosure when used for aerial applications (e.g., telephone poles, etc.). The cylindrical portion may include a cable entry grommet at one end through which a cable, e.g., communication or telephone cable, is received, and aerial cable ground bars therein. The rectangular portion, or termination housing compartment, may include or be capable of maintaining one or more termination blocks 100.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A wire termination block comprising:
   at least one conductive contact; and
   a body having a base portion and a driving portion, the driving portion having a plurality of apertures for receiving wires and being operable in at least two driving modes to terminate and couple a received wire to the conductive contact.

2. The wire termination block according to claim 1, wherein one of the two driving modes is operable by a user with a tool and the other of the two modes is operable by the user without a tool.

3. The wire termination block according to claim 1, wherein the driving portion includes a lever driven mechanism for terminating and coupling the received wires in a first of the two driving modes and a bolt mechanism for terminating and coupling the received wire in a second of the two driving modes.

4. The wire termination block according to claim 3, wherein the lever driven mechanism includes a lever body with apertures from the plurality of apertures for receiving wires and an arm which is pivotally connected to pivot the lever body between a first position for receiving wires and a second position for terminating the received wires to the conductive contact(s).

5. The wire termination block according to claim 4, wherein the lever driven mechanism is arranged on a top end of the driving portion.

6. The wire termination block according to claim 4, wherein the lever driven mechanism further comprises testing ports through which the conductive contact is accessible for testing.

7. The wire termination block according to claim 3, wherein the lever driven mechanism terminates small gauge wires, and the bold driven mechanism terminates large gauge wires.

8. The wire termination block according to claim 3, wherein the lever driven mechanism and the bold driven mechanism each have associated therewith a pair of apertures from the plurality of apertures, each pair of apertures are configured to receive a TIP and RING wire pair.

9. The wire termination block according to claim 8, wherein the pair of apertures associated with the lever driven mechanism are arranged above the pair of apertures associated with the bolt driven mechanism on the driving portion.

10. The wire termination block according to claim 1 wherein the base portion includes at least one finger which cooperates with the driving portion to prevent or reduce lateral movement of the driving portion when the driving portion is seated on the base portion.

11. The wire termination block according to claim 1, wherein the conductive contact comprises an insulation displacement connector (IDC).

12. The wire termination block according to claim 1, wherein the conductive contact comprises two contacts for connecting to TIP and RING wires, respectively.

13. The wire termination block according to claim 1, wherein the driving portion includes one or more cavities across which wires are received, the cavities being filled with a gel to provide a sealing function from the environment when wires are received and terminated.

14. The wire termination block according to claim 1, wherein the driving portion is formed of a translucent material.

15. The wire termination block according to claim 1, wherein the received wire is a communication wire.

16. A system for terminating a plurality of wires, comprising:
an enclosure; and
at least one termination block, maintained in the enclosure, including at least one conductive contact and a body having a base portion and a movable driving portion, the driving portion having a plurality of apertures for receiving wires and being operable in at least two driving modes to termination and couple a received wire to the conductive contact.

17. The system according to claim 16, wherein the enclosure is an aerial enclosure.

18. The system according to claim 16, further comprising a plurality of termination blocks, maintained in the enclosure.

19. A system for termination a plurality of wires, comprising:
an enclosure configured to maintain one or more termination blocks; and
at least one termination block including at least one terminal module having a base portion, a movable driving portion and a pair of insulation displacement connectors, the driving portion including:
a bolt driven mechanism with a first pair of apertures for receiving a TIP and RING wire pair and being operable by a user through use of a tool to linearly move the driving portion along the base portion to an open state for receiving a TIP and RING wire pair and a closed state for terminating and coupling the TIP and RING wire pair to respective insulation displacement connectors, and
a lever driven mechanism, arranged at a top of the driving portion, with a lever body having a lever arm and second pair of apertures for receiving a TIP and RING wire pair and being operable by a user through the lever arm without the use of a tool to pivot the lever body to an open state for receiving a TIP and RING wire pair and a closed state for terminating and coupling, the TIP and RING wire pair to respective insulation displacement connectors,
wherein the first pair of apertures is arranged below the second pair of apertures on the driving portion.

20. The system according to claim 19, wherein the base portion of the terminal module includes at least one finger which cooperates with the driving portion to prevent or reduce lateral movement of the driving portion when the driving portion is seated on the base portion.

21. An enclosure for terminating a plurality of wires, comprising:
at least one termination block including at least one conductive contact and a body having a base portion and a movable driving portion, the driving portion have a plurality of apertures for receiving wires and being operable in at least two driving modes to terminate and couple a received wire to the conductive contact.

* * * * *